(12) United States Patent
Griffin

(10) Patent No.: US 12,220,769 B2
(45) Date of Patent: Feb. 11, 2025

(54) METHODS FOR COUPLING AND HERMETICALLY SEALING COMPONENTS COMPOSED OF DIFFERENT MATERIALS

(71) Applicant: MICRO MOTION, INC., Boulder, CO (US)

(72) Inventor: Clinton R. Griffin, Erie, CO (US)

(73) Assignee: MICRO MOTION, INC., Boulder, CO (US)

( * ) Notice: Subject to any disclaimer, the term of this patent is extended or adjusted under 35 U.S.C. 154(b) by 248 days.

(21) Appl. No.: 17/775,179

(22) PCT Filed: Nov. 13, 2019

(86) PCT No.: PCT/US2019/061252
§ 371 (c)(1),
(2) Date: May 6, 2022

(87) PCT Pub. No.: WO2021/096500
PCT Pub. Date: May 20, 2021

(65) Prior Publication Data
US 2022/0395933 A1    Dec. 15, 2022

(51) Int. Cl.
*B23K 31/02*    (2006.01)
*B23K 31/00*    (2006.01)

(52) U.S. Cl.
CPC ............ *B23K 31/02* (2013.01); *B23K 31/003* (2013.01)

(58) Field of Classification Search
CPC .. B23K 31/02; B23K 31/003; B23K 2101/04; G01F 1/8409; G01F 15/185; F16L 21/002; F16L 21/005; F16L 21/007; G01N 30/606
See application file for complete search history.

(56) References Cited

U.S. PATENT DOCUMENTS

| | | | |
|---|---|---|---|
| 4,896,904 A | 6/1990 | Gadsden et al. | |
| 5,610,342 A | 3/1997 | Wenger et al. | |
| 5,731,527 A | 3/1998 | Van Cleve | |
| 6,047,457 A | 4/2000 | Bitto et al. | |
| 2011/0247924 A1* | 10/2011 | Cao | H01H 23/06 200/329 |
| 2022/0163492 A1* | 5/2022 | Toji | G01N 30/606 |

FOREIGN PATENT DOCUMENTS

| | | |
|---|---|---|
| EP | 0866317 A1 | 9/1998 |
| EP | 1914526 B1 | 7/2017 |
| WO | 0102813 A1 | 1/2001 |
| WO | 0124962 A1 | 4/2001 |

* cited by examiner

*Primary Examiner* — Lee A Holly

(74) *Attorney, Agent, or Firm* — The Ollila Law Group LLC

(57) ABSTRACT

A method for forming a pressure fit hermetic seal between a second component (104) and an interior member (108) is disclosed. The method comprises steps of coupling the second component (104) to a first component (102) by applying heat to one or more of the first component (102) and the second component (104) and allowing the first component (102) and the second component (104) to cool, wherein the applying heat step and allowing to cool step form the hermetic seal by causing compression of a hermetic element (106) against the second component (104) and by causing compression of the hermetic element (106) against the interior member (108).

19 Claims, 12 Drawing Sheets

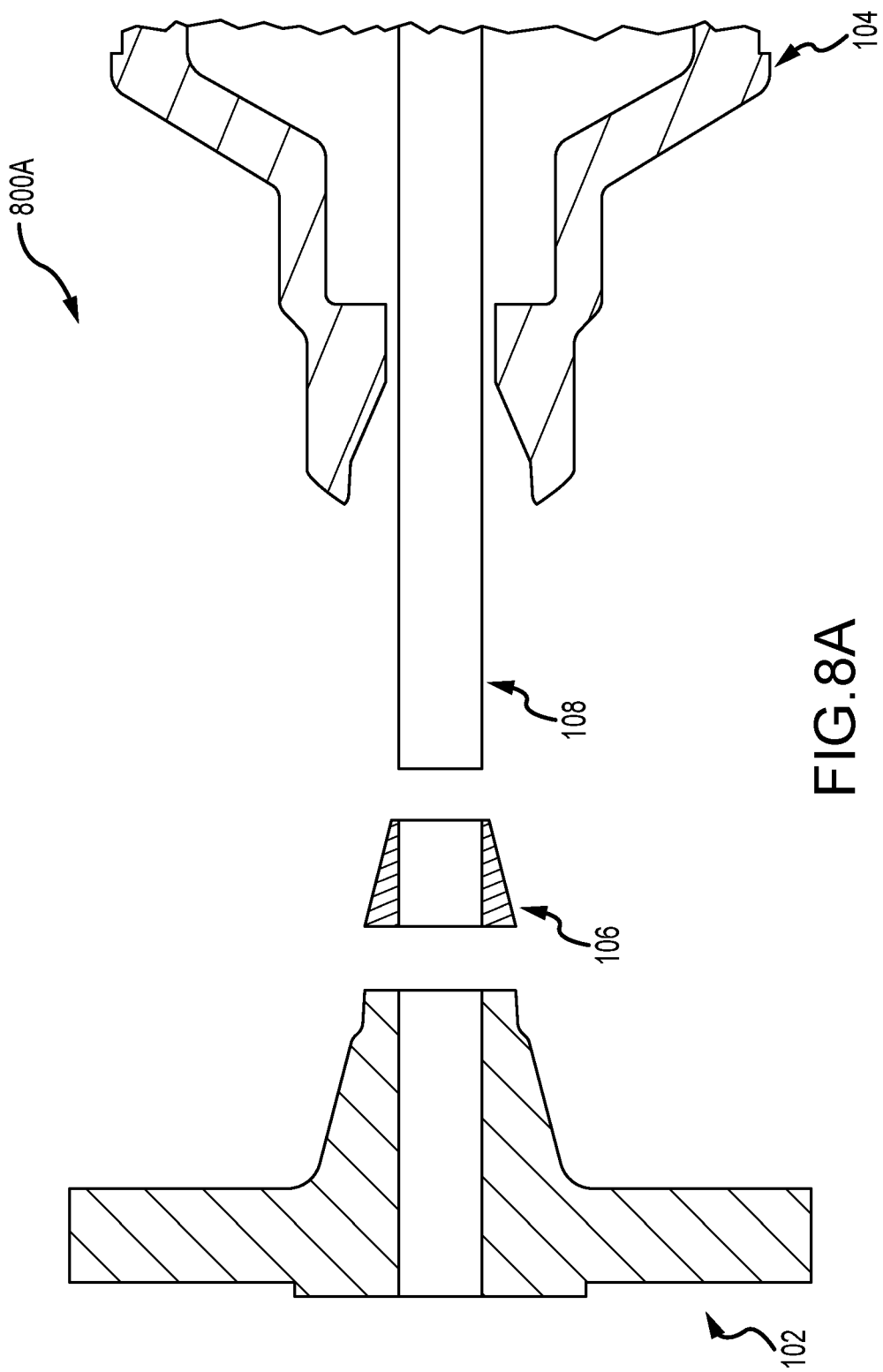

METHODS FOR COUPLING AND HERMETICALLY SEALING COMPONENTS COMPOSED OF DIFFERENT MATERIALS

TECHNICAL FIELD

The embodiments described below relate to hermetic seals, more particularly, to hermetic seals between components composed of different materials.

BACKGROUND

While traditional materials suffice for typical flow containment applications involving non-corrosive materials, specialized materials are required to contain and process corrosive materials. Tantalum, titanium, and zirconium are materials that effectively handle corrosive materials. In flow sensors, for instance, Coriolis flow sensors, if an application involving corrosive flow materials is contemplated, it is often beneficial to use tantalum, titanium, and/or zirconium in order to prevent corrosion that may be experienced by more traditional materials, such as stainless steel. Incorporating tantalum, zirconium, titanium and stainless steel into a single device can be difficult. The primary methods for coupling the four materials are explosion bonding and brazing. The four materials have vastly different coefficients of thermal expansion (hereinafter, "CTEs") making traditional methods of joining the metals problematic in some contexts. For instance, when forming a flow sensor, a number of different couplings have to be formed at differing temperatures and using different materials. Because the coefficients of thermal expansion differ, the extent to which metals expand and contract in response to temperature changes varies between each material. When forming the flow sensor, if heat is used to couple elements, for instance, using one or more of brazes, welds, and solders, the expansion and contraction of different materials can cause stress in the flow sensor. The flow sensor may have existing welds and brazes that can be affected if elements coupled by those existing welds and brazes are composed of different materials and exposed to higher temperatures resulting from further brazes or welds. In particular, a high weld temperature of a material can cause a hermetically sealed braze joint within the flow sensor to reflow and fail, for instance, at temperatures above 1,450° F.

Tantalum, in particular, has a high melting temperature on the order of 5,200° F. Tantalum is a highly desirable material to use in Coriolis flow sensors for corrosive material applications. Typically, in order to use tantalum in a weld, the weld must be conducted at a minimum of 2.9 inches from the braze so that the heating of materials can be controlled through use of water-cooled heat sinks. With many flow sensor designs, there is insufficient space to allow intermediate heat sinks to be applied without the heat sinks melting. Without applying heat sinks, these flow sensor designs cannot incorporate tantalum or other high melting point materials without compromising the hermetic seal and potentially allowing moisture to enter the case of the flow sensor, potentially causing the flow sensor to fail.

Accordingly, there is a need for a method of coupling and hermetically sealing elements composed of materials with different melting points and coefficients of thermal expansion.

SUMMARY

A method for forming a pressure fit hermetic seal between a second component (104) and an interior member (108) is disclosed. The method comprises steps of coupling the second component (104) to a first component (102) by applying heat to one or more of the first component (102) and the second component (104) and allowing the first component (102) and the second component (104) to cool, wherein the applying heat step and allowing to cool step form the hermetic seal by causing compression of a hermetic element (106) against the second component (104) and by causing compression of the hermetic element (106) against the interior member (108).

An assembly (200) is disclosed. The assembly comprises a first component (102), a second component (104), a hermetic element (106), and an interior member (108). The assembly (200) has a hermetic seal formed by a method comprising steps of coupling the second component (104) to the first component (102) by applying heat to one or more of the first component (102) and the second component (104) and allowing the first component (102) and the second component (104) to cool. The applying heat step and allowing to cool step form the hermetic seal by causing compression of the hermetic element (106) against the second component (104) and by causing compression of the hermetic element (106) against the interior member (108).

ASPECTS

According to an aspect, a method for forming a pressure fit hermetic seal between a second component (104) and an interior member (108) is disclosed. The method comprises steps of coupling the second component (104) to a first component (102) by applying heat to one or more of the first component (102) and the second component (104) and allowing the first component (102) and the second component (104) to cool, wherein the applying heat step and allowing to cool step form the hermetic seal by causing compression of a hermetic element (106) against the second component (104) and by causing compression of the hermetic element (106) against the interior member (108).

Preferably, the hermetic element (106) has a first end (506) and a second end (508), the hermetic seal formed between the interior member (108) and the second component (104) having a conformal interior periphery (120), the hermetic seal incorporating the hermetic element (106). The applying heat further comprises applying heat to a heating site (118), the heating site (118) on one or more of an exterior of the second component (104) and an exterior of the first component (102), the heat applied when the first component (102) is engaged with all of the second component (104), the hermetic element (106), and the interior member (108). The compressions are caused by expansion resulting from the applying heat step and contraction resulting from the allowing to cool step, the expansion and contraction being of portions of the first component (102) and the second component (104) that are heated in the applying heat step.

Preferably, the method further comprises engaging, before the coupling step, a conformal exterior (502) of the hermetic element (106) to a conformal interior periphery (120) of the second component (104) while engaging a conformal interior (504) of the hermetic element (106) to a portion of an exterior periphery of the interior member (108) and engaging, before the coupling step, an abutting end (114) of a first component (102) with the second end (508) of the hermetic element (106) while engaging an interior of the first component (102) with another portion of the exterior periphery of the interior member (108) and while engaging a first coupling portion (110) of the first component (102) with a second coupling portion (112) of the second component (104). The applying heat step comprises heating, at the heating site (118), such that at least part of the second coupling portion (112) and the first coupling portion (110) melt and form a weld.

Preferably, after the engaging steps but before the coupling step, the second coupling portion (112) and the first coupling portion (110) are engaged to at least partially overlap, the second coupling portion (112) at least partially radially external of at least part of a cross sectional peripheral exterior of the first coupling portion (110).

Preferably, the hollow conformal interior (504) at least partially conforms to the exterior of the interior member (108) and the conformal exterior (502) at least partially conforms to the conformal interior periphery (120) of the second component (104).

Preferably, the first component (102) is one of a flange (400) and a common assembly (300) and the second component (104) is the other of the flange (400) and the common assembly (300), and wherein the interior member (108) is a flow tube (302) that has been coupled to an interior of the common assembly (300) before the method begins.

Preferably, the hermetic element (106) is composed of a material that is more malleable than the material of which one or more of the first component (102), the second component (104), and the interior member (108) is composed.

Preferably, the applying heat step comprises heating sufficiently such that a fusion bond is formed between the hermetic element (106) and two or more of the first component (102), the second component (104), and the interior member (108).

Preferably, the heat applied in the applying heat step does not melt any portion of the hermetic element (106).

Preferably, the compressions are compressed in compression directions, the compression directions comprising a longitudinal compression direction and a radial inward compression direction, wherein the applying heat step and the allowing to cool step are sufficient to cause a longitudinal pressure (802) and a radial inward pressure (804), such that the longitudinal pressure (802) causes a compression of at least part of the hermetic element (106) in the longitudinal compression direction to be at least fifty thousandths of an inch and the radial inward pressure (804) causes a compression of at least part of the hermetic element (106) in the radial inward compression direction to be at least twenty thousandths of an inch.

According to an aspect, an assembly (200) is disclosed. The assembly comprises a first component (102), a second component (104), a hermetic element (106), and an interior member (108). The assembly (200) has a hermetic seal formed by a method comprising steps of coupling the second component (104) to the first component (102) by applying heat to one or more of the first component (102) and the second component (104) and allowing the first component (102) and the second component (104) to cool. The applying heat step and allowing to cool step form the hermetic seal by causing compression of the hermetic element (106) against the second component (104) and by causing compression of the hermetic element (106) against the interior member (108).

Preferably, the hermetic element (106) has a first end (506) and a second end (508), the hermetic seal formed between the interior member (108) and the second component (104) having a conformal interior periphery (120), the hermetic seal incorporating the hermetic element (106). The applying heat further comprises applying heat to a heating site (118), the heating site (118) on one or more of an exterior of the second component (104) and an exterior of the first component (102), the heat applied when the first component (102) is engaged with all of the second component (104), the hermetic element (106), and the interior member (108). The compressions are caused by expansion resulting from the applying heat step and contraction resulting from the allowing to cool step, the expansion and contraction being of portions of the first component (102) and the second component (104) that are heated in the applying heat step.

Preferably, the heating site (118) is behind (510) the second end (508) of the hermetic element (106).

Preferably, the method further comprises engaging, before the coupling step, a conformal exterior (502) of the hermetic element (106) to a conformal interior periphery (120) of the second component (104) while engaging a conformal interior (504) of the hermetic element (106) to a portion of an exterior periphery of the interior member (108) and engaging, before the coupling step, an abutting end (114) of a first component (102) with the second end (508) of the hermetic element (106) while engaging an interior of the first component (102) with another portion of the exterior periphery of the interior member (108) and while engaging a first coupling portion (110) of the first component (102) with a second coupling portion (112) of the second component (104). The applying heat step comprises heating, at the heating site (118), such that at least part of the second coupling portion (112) and the first coupling portion (110) melt and form a weld.

Preferably, the abutting end (114) of the first component (102) is a first flat end and the second end (508) of the hermetic element (106) has a flat hermetic end (116).

Preferably, the hollow conformal interior (504) at least partially conforms to the exterior of the interior member (108) and the conformal exterior (502) at least partially conforms to the conformal interior periphery (120) of the second component (104).

Preferably, the conformal interior (504) is cylindrical and the conformal exterior (502) is in the shape of a peripheral exterior of a frustrum.

Preferably, the first component (102) is one of a flange (400) and a common assembly (300) and the second component (104) is the other of the flange (400) and the common assembly (300), and wherein the interior member (108) is a flow tube (302) that has been coupled to an interior of the common assembly (300) before the method begins.

Preferably, the hermetic element (106) is composed of a material that is more malleable than the material of which one or more of the first component (102), the second component (104), and the interior member (108) is composed.

Preferably, the interior member (108) is at least partially composed of one or more of tantalum, zirconium, and titanium and wherein one or more of the first component (102) and the second component (104) is at least partially composed of one or more of stainless steel and C22.

BRIEF DESCRIPTION OF THE DRAWINGS

The same reference number represents the same element on all drawings. It should be understood that the drawings are not necessarily to scale.

FIG. 8A shows an illustration of a bisected side view of an embodiment of uncoupled components before engagement or welding.

DETAILED DESCRIPTION

Figure 1:
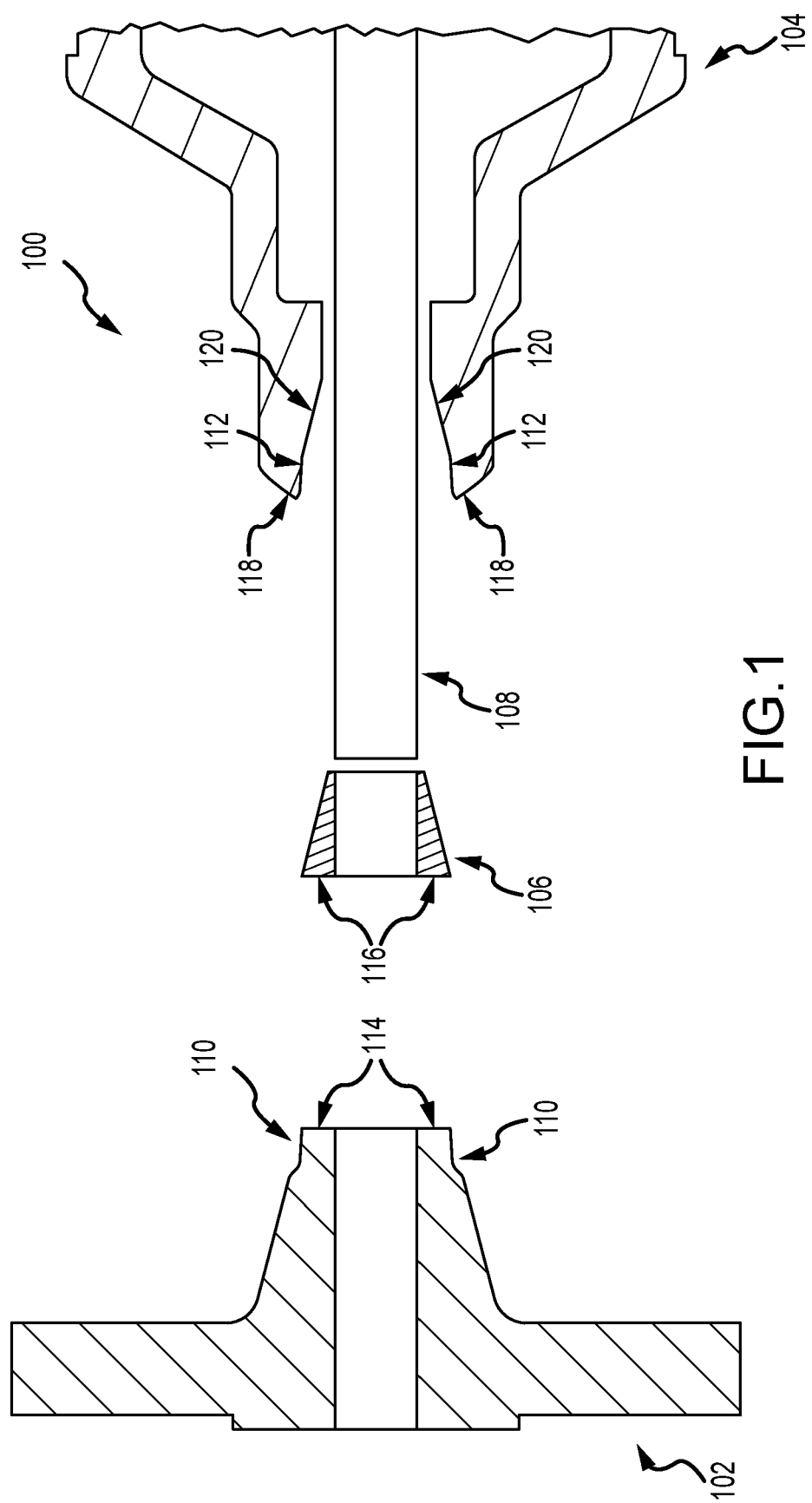
FIG. 1 shows a bisected side view of an embodiment of a collection 100 of uncoupled components.

FIGS. 1-8E and the following description depict specific examples to teach those skilled in the art how to make and use the best mode of embodiments of methods for forming a hermetic seal between components of different materials. For the purpose of teaching inventive principles, some conventional aspects have been simplified or omitted. Those skilled in the art will appreciate variations of these examples that fall within the scope of the present description. Those skilled in the art will appreciate that the features described below can be combined in various ways to form multiple variations of methods for forming a hermetic seal between components of different materials. As a result, the embodiments described below are not limited to the specific examples described below, but only by the claims and their equivalents.

Coupling and/or creating hermetic seals between components of vastly different thermal properties is impractical using traditional methods. For these applications, it may be best to use a pressure fit or fusion bond to create the hermetic seal between the components of materials with different properties. One way to accomplish this is to couple two components of similar materials in such a way that it causes compression of an intermediate, hermetic element between a component and another component composed of a material with vastly different properties than those of the other components. For instance, in a flow sensor that is to be used for corrosive materials, a flow tube made of tantalum may be required. Tantalum is expensive, so it does not make sense to compose an entire sensor of tantalum. It may be best to make the entire flow path that is to interact with the corrosive substance of tantalum. Welding other components to a tantalum component is problematic as tantalum melts at a significantly higher temperature than conventional, less expensive materials used in flow sensors.

Also, the coefficients of expansion are vastly different, causing issues. In an embodiment, the flow tube could be composed of tantalum. It may be preferable to couple a case to a flange, the case and flange each made of conventional materials, in order to cause a weld shrink about a hermetic element (perhaps made of a more malleable material). This will cause the hermetic element to be compressed against the exterior of the flow tube and the interior of one or more of the case and the flange, creating a hermetic seal between the interior of the one or more of the case and the flange and the exterior of the hermetic element, as well as a hermetic seal between the interior of the hermetic element and the exterior of the flow tube. In so doing, a pressure fit hermetic seal between the one or more of the case and the flange made of conventional materials and the flow tube made of tantalum is possible without attempting to weld the conventional materials with the tantalum. If sufficient heat and pressure are applied, and if the components are arranged sufficiently conformally, it may be possible to further form fusion bonds between elements in addition to or instead of the pressure fit coupling, perhaps making a more robust coupling and/or hermetic seal. It should be appreciated that, while the embodiments presented are disclosed with respect to a flow sensor, embodiments are contemplated for forming hermetic seals in other devices or arrangements.

FIG. 1 shows a bisected side view of an embodiment of a collection 100 of uncoupled components. In an embodiment, the collection 100 of uncoupled components may be a collection of uncoupled flow sensor components. The collection 100 may include a first component 102, a second component 104, a hermetic element 106, and an interior member 108.

The first component 102 is an assembly, for instance, a component of a flow sensor. The first component may have a first coupling portion 110. The first coupling portion 110 is a portion of the first component 102 that is coupled to a portion of the second component 104. In an embodiment, the first coupling portion 110 is an external circumferential portion of the first component. The first component 102 may also have an abutting end 114. The abutting end 114 abuts the hermetic element 106, perhaps at a second side 508 of the hermetic element. In an embodiment, the abutting end 114 may be an optional first flat end to engage a flat hermetic end 116 of the hermetic element 106.

The second component 104 is a component, perhaps of the flow sensor. In an embodiment, the second component 104 is different from the first component 102. The second component 104 may have a second coupling portion 112. In an embodiment, the second coupling portion 112 is an internal peripheral portion of the second component 104. It should be appreciated that the first coupling portion 110 and the second coupling portion 112 may be external and internal peripheral (perhaps, circumferential) portions of the first component 102 and the second component 104, respectively. The second component 104 may also have an interior circumference that largely conforms to the exterior of the hermetic element 106. The second component 104 may also have a heating site 118 where heat is applied to the exterior of the second component 104, perhaps to form a weld that facilitates the couplings herein described. Although depicted as being above and below the second component 104 in the limited side view, it should be understood that the heating is conducted about the periphery of the second component 104, perhaps at external peripheral portions of the second component 104 at longitudinal portions at which the second coupling portion 112 overlaps the first coupling portion 110 when the first component 102 and the second component 104 are engaged. For the purposes of this specification, longitudinal means along the length of the interior member 108. For instance, in an embodiment in which the common assembly is interior componentry of a flow sensor, the longitudinal direction will be along the flow tube 302. Also, a longitudinal axis may be described as a central axis that extends along the longitudinal length of the interior member 108 and is centrally located in each cross section of the longitudinal length of the interior member 108. For instance, in a straight tube flow sensor, the flow tube 302 will have a straight longitudinal axis. In a curved tube flow sensor, the longitudinal axis will conform to the center of the flow tube 302 at each cross section at each position of the flow tube 302 along the longitudinal length of the flow tube 302, such that the longitudinal axis is correspondingly curved.

In another embodiment, the heating site may be alternatively or additionally on an exterior portion of the first component 102. When the heating/welding is conducted, it should be appreciated that parts of one or more of the first coupling portion 110 and second coupling portion 112 may be sacrificial to the weld, forming a coupling and/or weld between the first coupling portion 110 and the second coupling portion 112. The second component 104 may have an interior cavity, the interior cavity having a conformal interior periphery 120. It should be appreciated that the conformal interior periphery 120 may be the element that is hermetically sealed with the exterior of the interior member 108 using the hermetic element 106.

The interior member 108 is an interior member around which a hermetic seal is formed. Flow tube 302 may be an embodiment of the interior member 108. The interior member 108 may be partially circumferentially surrounded by one or more of the first component 102 and the second component 104. When a weld is formed between the first component 102 and second component 104 on a side of a common assembly, it can be appreciated that the interior member 108 may circumferentially surrounded on that side by the resulting assembly. In an embodiment, the interior member 108 may be an integral component of a common assembly, the common assembly perhaps being one of the first component 102 and the second component 104.

It should be appreciated that the coupling between the first coupling portion 110 and the second coupling portion 112 may be accomplished by a weld at a site proximal to both the first and second coupling portions 110 and 112. The heating site 118 is a site at which the first component 102 is welded to the second component 104. The heating site 118 may be located such that the first and second coupling portions 110 and 112 are coupled by a weld at the heating site 118. The heating site 118 may have different arrangements relative to other components in the system 200 when engaged and/or after coupling is finished. For instance, the heating site 118 may be one or more of on the exterior of a portion of the second component 104 at which there is some overlap between the first and second coupling portions 110 and 112 in a radial axis with respect to an interior member 108 (e.g. interior of flow tube 302), at a position closer to a second end 508 of a hermetic element 106 than a first end 506 of a hermetic element, at a position "behind" 510 the second end 508 of the hermetic element (as discussed in FIG. 5), at a position of overlap between a flange and a case, at a position where during a weld shrink the weld shrink will apply pressure to force a hermetic element 106 to create a hermetic seal between the second component 104 and the interior member 108, and/or the like. Welding substantially cylindrical elements with circumferential welds typically requires that welds be applied at a spot with the substantially cylindrical elements rotated as the weld is being applied. In an embodiment, the heating site 118 will change as the components are rotated, but the heating site 118 may be at substantially the same longitudinal location as the elements are rotated. The heating may be quick, with the ensuing cooling beginning almost immediately.

The hermetic element 106 is an element that is used to form a hermetic seal between a conformal interior periphery 120 of the second component 104 and one or more of the first component 102 and at least part of the interior member 108. In an embodiment in which the conformal interior periphery 120 of second component 104 is hermetically sealed with at least one element of the second component 104, the hermetic element 106 may be used to form a hermetic seal as between a case 312 of a common assembly 300 and one or more of the flange 400 and a flow tube 302 of the common assembly 300. An embodiment of a common assembly 300 with an embodiment of a case 312 and a flow tube 302 is shown and described with respect to FIG. 3. An embodiment of the flange 400 may be shown and described with respect to FIG. 4. For purposes of this specification, the terms flow tube 302 and interior member 108 may be used interchangeably, although embodiments ae contemplated in which the interior member is not a flow tube or even an element of a flow sensor. In an embodiment the hermetic element 106 may have a shape that conforms the hermetic element's 106 exterior to a conformal interior periphery 120 and conforms the hermetic element's 106 interior to another element of one of the first component 102 and the second component 104. For instance, in an embodiment in which the first component 102 is a flange 400 and the second component 104 is a common assembly 300, the hermetic element 106 may have a shape such that the exterior of the hermetic element 106 conforms to the interior of a case 312 of the common assembly 300 and conforms to the exterior circumference of a flow tube 302 of the common assembly 300, such that the shape of the hermetic element 106 can be considered complementary to those elements to which the hermetic element 106 is largely conformal. Alternatively, in an embodiment in which the first component 102 is a common assembly 300 and the second component 104 is a flange 400, the hermetic element 106 may have a shape such that the exterior of the hermetic element 106 largely conforms to the interior of the flange 400 and the exterior of the hermetic element 106 largely conforms to the external circumference of the flow tube 302 of a common assembly 300, such that the shape of the hermetic element 106 can be considered complementary to those elements to which the hermetic element 106 is largely conformal.

In an embodiment, the hermetic element 106 has a hollow interior, perhaps for receiving a flow tube 302 of a common assembly 300. The hermetic element 106 may have an exterior shape that is conical or substantially conical. For instance, when referring to conical shapes, the exterior conical shape is like a frustrum (e.g. a cone with its tip cut off). This would not be a complete cone or frustrum, as the center of the hermetic element 106 would conform to the exterior of an interior member 108 (necessitating the removal of the cap portion of the cone as well as the center (perhaps cylindrical) volume of the frustum) to make the "conical" or "frustum" exterior. For the purposes of this specification, the terms "conical exterior" and "frustum exterior" are meant to refer to the exterior of a frustrum or cone without the tip. The hermetic element 106 may have a hollow interior, the interior perhaps being cylindrical or substantially cylindrical, perhaps to receive the flow tube 302 of a common assembly 300. The hermetic element 106 may also have a substantially flat hermetic end 116 on a second end 508 of the hermetic element 106. The second end 508, perhaps at a flat hermetic end 116, may abut an abutting end 114 of the first component 102, for instance an optional first flat end of the first component 102. This combination of shapes may facilitate a wedge action when force from the weld shrink compresses the hermetic element 106 against the flow tube 302 and the conformal interior periphery 120 to form the hermetic seal. In alternative embodiments, the hermetic element 106 may be of different shapes, for instance, a shape having a cylindrical interior cavity and a cylindrical exterior. The hermetic element 106 may be composed of a metal that facilitates good hermetic seals, for instance, one or more of copper and brass. The hermetic element 106 may be composed of a material that is more malleable than the material of which the first component 102 is composed. The hermetic element 106 may be composed of a material that is more malleable than the material of which the second component 104 is composed. The hermetic element 106 may be composed of a material that is more malleable than the material of which the interior member 108 is composed.

In an unassembled state, the first coupling portion 110 may be substantially conformal to the second coupling portion 112, such that when the first coupling portion 110 is engaged with the second coupling portion 112 in an unassembled state, there is very little space between the first coupling portion 110 and the second coupling portion 112. Consequently, in this embodiment, the second coupling portion 112 may be considered complementary to the first coupling portion 110. The relative arrangement of the second coupling portion 112 and the conformal interior periphery 120 may be such that they are separate or overlap. With respect to the assembly, if the weld is conducted on a flow sensor, the conformal interior periphery 120 may be at least partially proximal (to the extent they do not overlap) to the second coupling portion 112 (with respect to the center of the assembly formed, for instance, a flow sensor).

Figure 2:
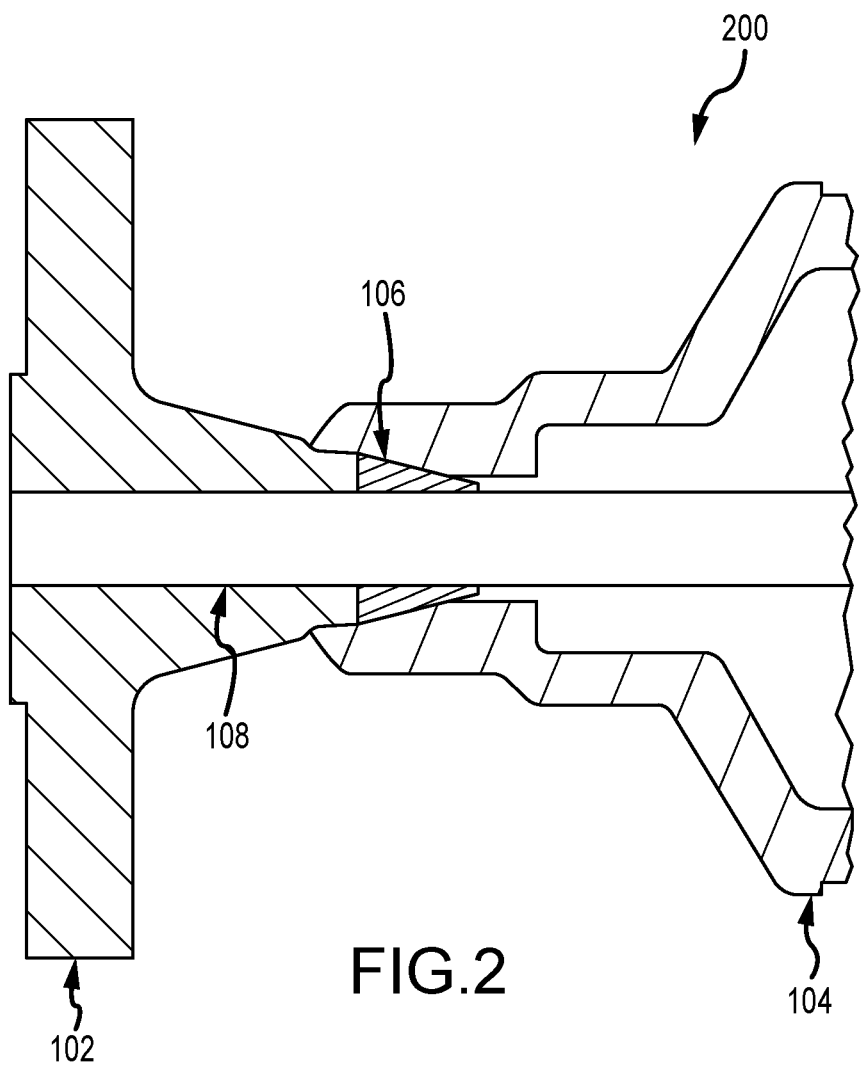
FIG. 2 shows a bisected side view of an embodiment of an assembly 200 of coupled components from FIG. 1.

In an embodiment, a coupling may be formed between the first coupling portion 110 and the second coupling portion 112. As depicted in FIGS. 1 and 2, an embodiment in which the first component 102 is a flange 400 of a flow sensor and the second component 104 is a common assembly 300 that includes a case 312 and flow tube 302 is contemplated. Embodiments in which the first component 102 is the common assembly 300 and the second component 104 is the flange 400 are contemplated as well. That is, embodiments in which an exterior portion of a flange 400 is coupled to an interior portion of a case 312 of a common assembly 300 (shown) and embodiments in which an exterior portion of a case 312 of a common assembly 300 is coupled to an interior portion of a flange 400 (not shown) are contemplated.

In various embodiments, when components have been stated as being conformal or complementary, it should be understood that the spaces between these components in an engaged and uncoupled state may be small. The spaces between any of these conformal or complementary engagements may be on the order of thousandths of an inch, for instance 1, 2, 3, 4, 5, 6, 7, 8, 9, 10, 11, 12, 13, 14, 15, 16, 17, 18, 19, or 20 thousandths of an inch. An effective hermetic seal may be formed by the coupling of the first component 102, the second component 104, and the hermetic element 106, such that the hermetic element 106 is longitudinally compressed by, for instance, 10, 20, 30, 40, 50, 60, or 70 thousandths of an inch, and is radially compressed about the circumference of the flow tube 302 by, for instance, 10, 20, 30, 40, 50, 60, or 70 thousandths of an inch. The spaces may alternatively be characterized by a percentage of the outer or inner diameter of the flow tube 302, for instance, 0.1, 0.2, 0.3, 0.4, 0.5, 0.6, 0.7, 0.8, and the like percent of the outer diameter of the flow tube 302.

For purposes of this specification, the common assembly 300 is a partially assembled interior componentry of a flow sensor. The common assembly 300 may have a case 312 and a flow tube 302. The flow tube 302 may be composed of a material that is different from the material of which the case 312 and flange 400 are composed. The case 312 and the flange 400 may be composed of conventional materials having low CTEs and/or low melting points relative to materials used to form the flow tube 302, conventional materials perhaps including, for instance, one or more of stainless steel and C22 (C22 being an alloy of nickel, chromium, molybdenum, and tungsten). The flow tube 302 (or interior member) may be composed of specialized materials having high CTEs and/or high melting points, for instance, one or more of tantalum, zirconium, and titanium. As mentioned, it is difficult to couple the conventional materials to the specialized materials by traditional methods. This is especially true for tantalum which has a melting point of over 5400° F. Welding tantalum with 300 series stainless steel may be impractical, as the melting point of 300 series stainless steel is significantly lower. The coupling of the conventional and specialized materials may be important for specific applications, such as flow sensors to be used with corrosive materials. Flow sensors used to measure corrosive materials will have a flow path that is entirely comprised of specialized materials, such that no component of the flow sensor composed of conventional materials interacts with the corrosive flow fluid.

While the coupling of this disclosure is only shown for a flange 400 and a common assembly 300 on one side of a flow sensor, it should be appreciated that these apparatus and method features may be applied to the second side of the flow sensor. Typical flow sensors may have two flanges 400 on terminal ends of the flow sensor in order to couple to external fluid flow elements, so the same issues with respect to creating a corrosion resistant flow path apply to both sides of a flow sensor. This may require the methods and features within to couple to the corrosion resistant elements composed of specialized materials to other elements composed of conventional materials.

In some embodiments, the hermetic seal is only formed between the conformal interior periphery 120, the hermetic element 106 and the flow tube 302. In further embodiments, the hermetic seal is formed between all of the first component 102, the conformal interior periphery 120, the hermetic element 106, and the flow tube 302. For instance, the weld shrink may be sufficient such that fusion bonds are formed between two or more of the first component 102, the conformal interior periphery 120, the hermetic element 106, and the flow tube 302. In these embodiments, the bond formed is not a simple pressure fit. However, when, in the claims, the term "pressure fit" is used, it is contemplated that the pressure fit may include embodiments in which the pressure was sufficient to establish fusion bonds such that, even when components that were pressure fit are separated, the fusion bonds do not readily disengage.

FIG. 2 shows a bisected side view of an embodiment of an assembly 200 of coupled components from FIG. 1. In an embodiment, assembly 200 of coupled components may be coupled flow sensor components. In order to couple uncoupled components of FIG. 1, the components must be engaged, and, subsequently, a weld must be formed between certain components, as is described in the methods presented with respect to the descriptions of the flowcharts. After the weld has been conducted between the first component 102 and the second component 104, and the weld shrink creates a hermetic seal between the second component 104 and the flow tube 302 of the common assembly 300, the result may appear as in FIG. 2. The elements referenced in FIG. 2 are embodiments of the elements with the same reference numbers in FIG. 1. Again, as depicted, the flange 400 is the first component 102 and the common assembly 300 is the second component 104, but embodiments are contemplated where the common assembly 300 is the first component 102 and the flange 400 is the second component 104. Further, embodiments are contemplated where the assembly is not a component of a flow sensor, such that the first component 102 and the second component 104 may be other things.

Figure 3:
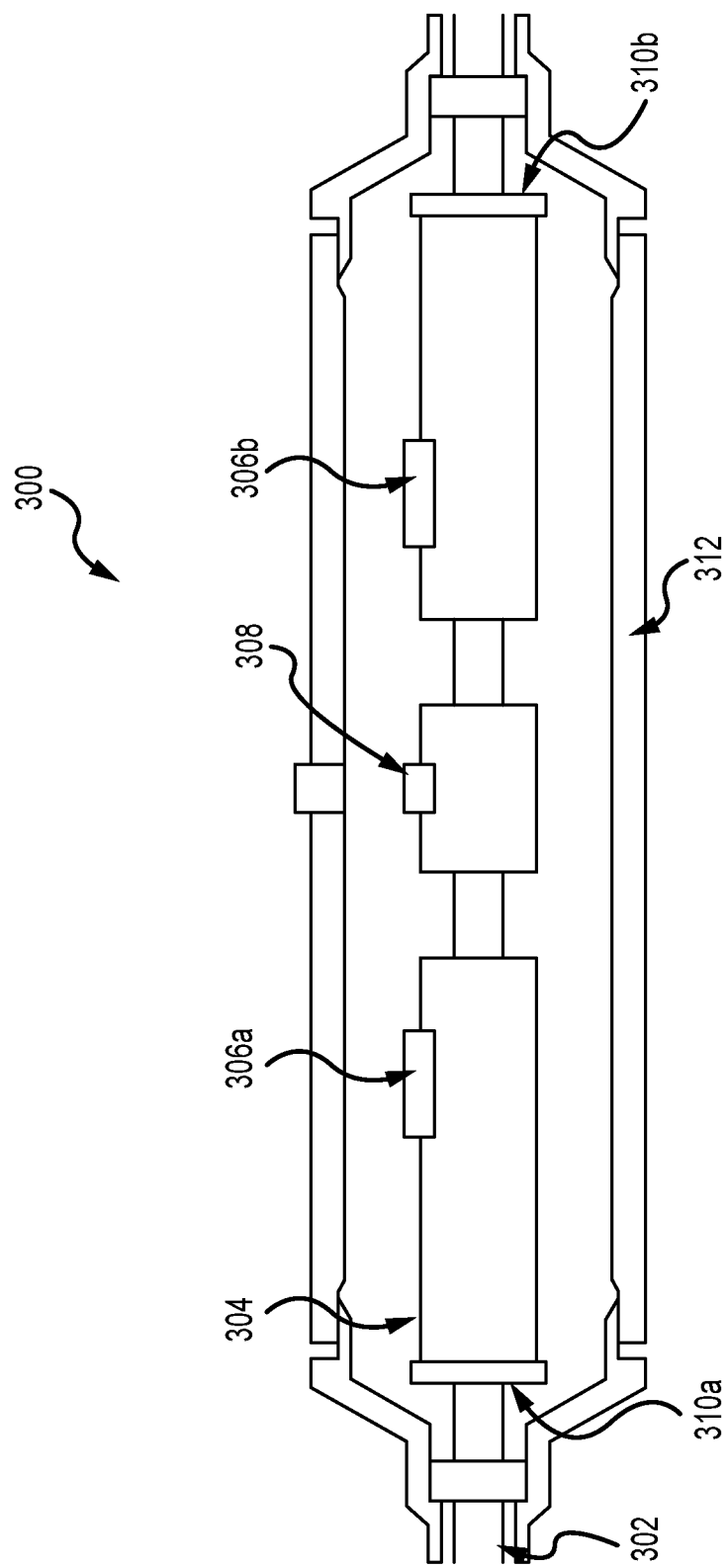
FIG. 3 shows a bisected side view of an embodiment of a common assembly 300.

FIG. 3 shows a bisected side view of an embodiment of a common assembly 300. The common assembly 300 has a flow tube 302, a balance bar 304, flow sensors 306a and 306b, driver 308, support brackets 310a and 310b, and a case 312.

During flow sensor manufacture, there are a number of steps in the fabrication. Typically, an intermediate step in the process is forming a common assembly 300 of certain components. The common assembly 300 is an intermediate assembly of the interior componentry of a flow sensor. Prior art assembly methods exist to assemble the common assembly 300, such that any methods in this specification may start from a step in the flow sensor manufacturing process where the common assembly 300 is already formed. The same applies to the flange 400.

The flow tube 302 is a component of a flow sensor through which fluid is flowed. In various applications, it is desirable to make the entire flow path in the flow sensor composed of a corrosive or heat resistant material. In these applications, embodiments of the flow tube 302 may be at least partially or even entirely composed of specialized materials, for instance, one or more of tantalum, zirconium, and titanium. These materials may be used in pure form or may be introduced as alloys. The flow tube 302 may be coupled to the interior of the common assembly, but the flow tube 302 may have ends protruding from the common assembly to allow flanges 400 to be coupled to the terminal ends. In an embodiment, there may also be a length of the flow tube 302 that is exposed with respect to the interior of the common assembly 300 around which a hermetic element 106 used to form a hermetic seal around the flow tube 302 may be situated and later compressed.

The balance bar 304 is a component used to provide balance to the flow tube and allow for balanced vibration of the flow tube 302. The driver 308 is a transducer that drives vibrations in the flow tube 302. Flow sensors 306a and 306b are sensors that detect vibrations of the flow tube 302, perhaps detecting vibrational responses to the vibrations driven by the driver 308. Coriolis flow sensors use drivers 308 and flow sensors 306a and 306b to determine flow fluid and/or fluid flow properties, for instance, mass flowrate, density, viscosity, and/or the like. The manners in which these measurements are conducted are well-established in the art and are omitted for brevity. The support brackets 310a and 310b are supports that fix certain elements of the flow sensor to a case 312, perhaps fixing the elements via a brace bar (not shown).

The case 312 is a container for the flow sensor elements. The case 312 is typically hermetically sealed to prevent environmental fluids from entering the flow sensor. In an embodiment in which the common assembly 300 is the second component 104 (as depicted in FIGS. 1 and 2), the case 312 may be the element of the common assembly that has the second coupling portion 112, the heating site 118, and the conformal interior periphery 120. In this embodiment, the hermetic seal is created between at least the conformal interior periphery 120 of the case 312 and the flow tube 302 using the hermetic element 106. In an embodiment in which the common assembly 300 is the first component 102, the case 312 may have the first coupling portion 110 on a part of its exterior. In this embodiment, the case 312 may have the abutting end 114 that abuts the second end 508 (perhaps a flat hermetic end 116) of the hermetic element 106, and, in this embodiment, the case 312 may or may not be an element of the hermetic seal.

Figure 4:
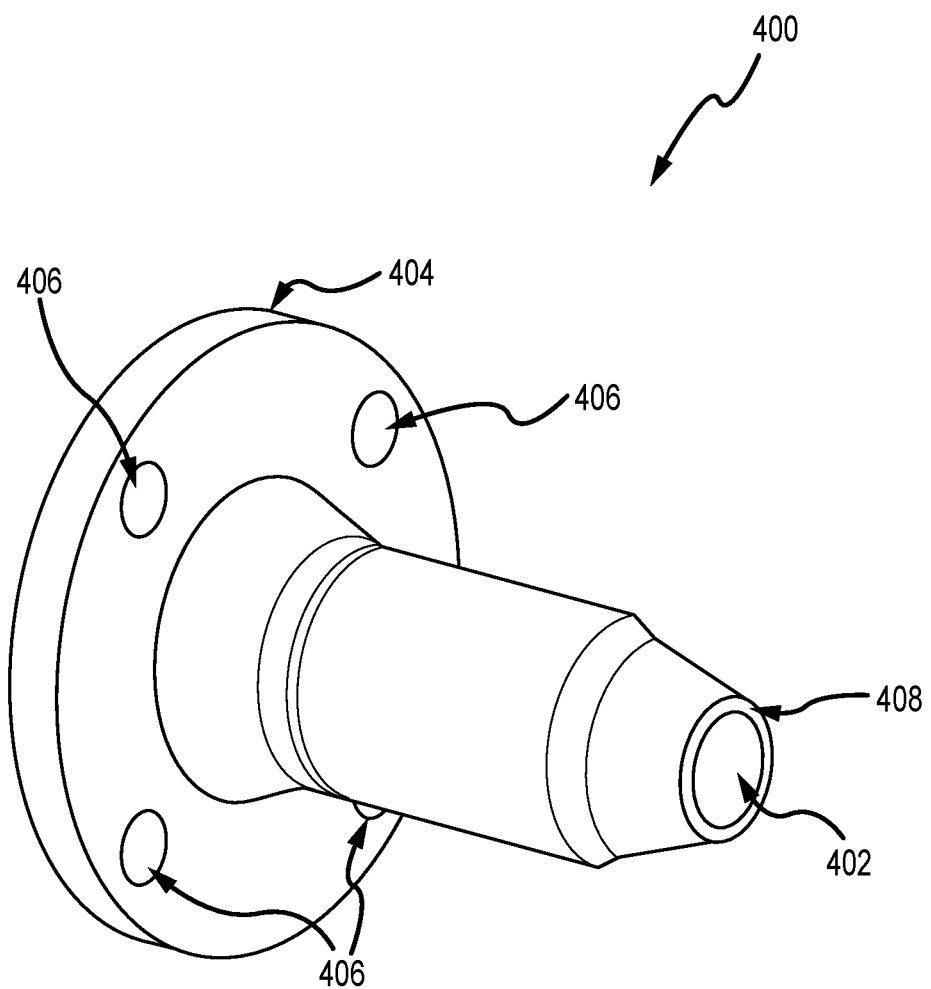
FIG. 4 shows a bisected side view of an embodiment of a flange 400.

FIG. 4 shows a perspective view of an embodiment of a flange 400. The flange 400 is a terminal element in a flow sensor used to couple the flow sensor to fluid flow sources, for instance, conduits. The flange 400 may also participate in a hermetic seal that prevents leakage of environmental materials into places in the flow sensor not intended to receive environmental fluids. The flange 400 has a hollow interior 402 and a coupling member 404 having holes 406. The hollow interior 402 is a hollow passage through which a flow tube 302 may be placed. The coupling member 404 is an element that couples the flange 400 and, hence, the flow sensor to external flow elements. The coupling member may have holes 406 to facilitate the coupling between the flange 400 and external flow elements.

In an embodiment in which the flange 400 is the second component 104, the flange 400 may have the second coupling portion 112, the heating site 118, and the conformal interior periphery 120. In this embodiment, the hermetic seal may be created between at least the conformal interior periphery 120 of the flange 400 and the flow tube 302 using the hermetic element 106. In an embodiment in which the flange 400 is the first component 102 (as depicted in FIGS. 1 and 2), the flange 400 may have the first coupling portion 110 on a part of its exterior. In this embodiment, the flange 400 may have the abutting end 114 (perhaps an optional flat end 408 as shown) that abuts the second end 508 (perhaps, at a flat hermetic end 116) of the hermetic element 106, and in this embodiment, the flange 400 may or may not be an element of the hermetic seal.

Figure 5:
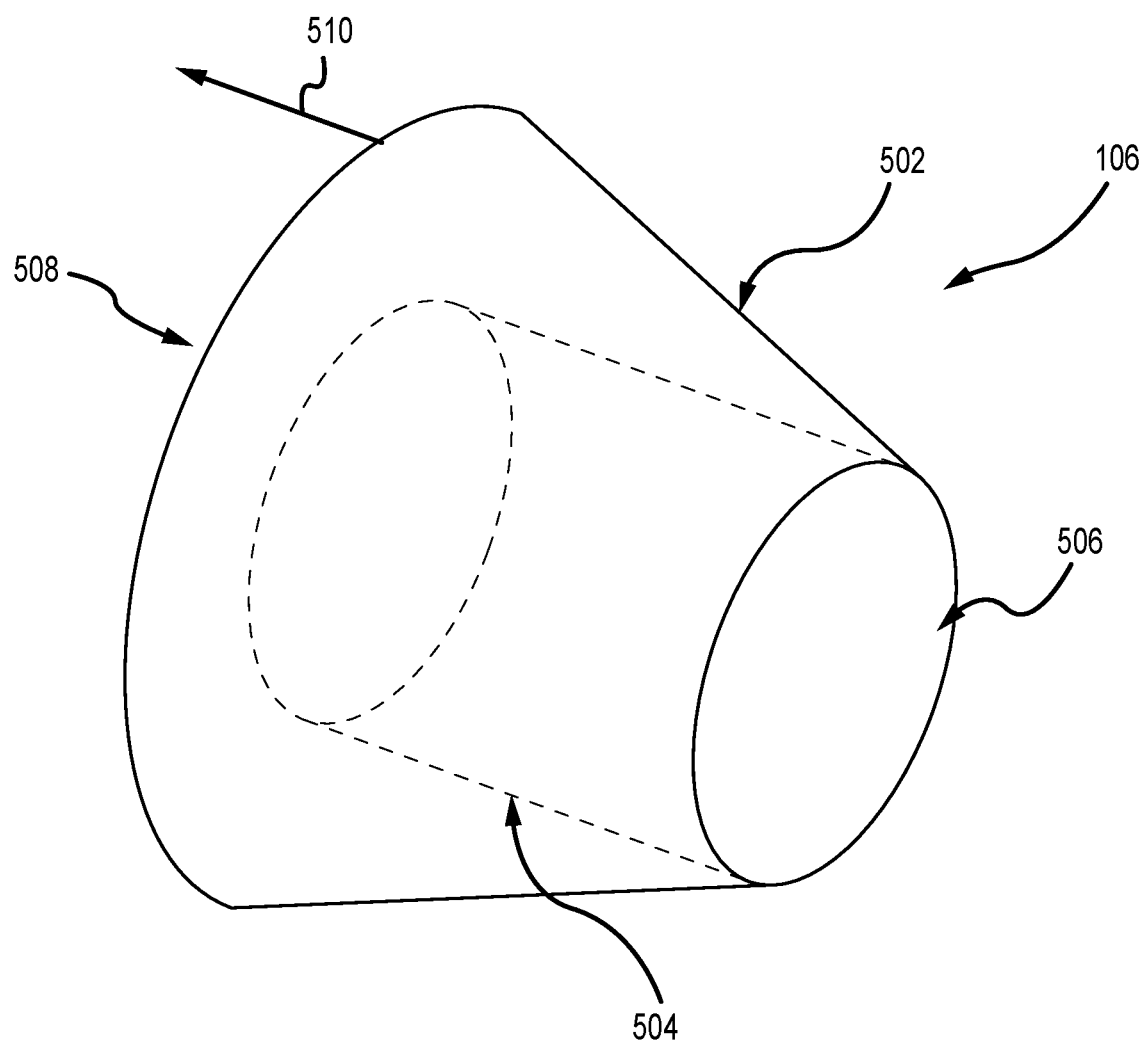
FIG. 5 shows a bisected side view of an embodiment of a hermetic element 106.

FIG. 5 shows a perspective view of an embodiment of a hermetic element 106. Hermetic element 106 is an embodiment of the hermetic element 106 described with respect to FIGS. 1 and 2. As depicted in FIGS. 1 and 2, an embodiment of the hermetic element is one having a conformal exterior 502 and a hollow conformal interior 504 that is substantially cylindrical, the hollow interior 504 perhaps for receiving an interior member 108 (e.g. flow tube 302). The conformal exterior 502 conforms to a conformal portion of an interior of the second component. The hermetic element 106 may have a first end 506 and a second end 508. In an embodiment, the second end 508 may be the flat hermetic end 116. In an embodiment, the second end 508 may be wider (e.g. have a greater width or have a greater exterior diameter) than the first end 506. In an embodiment, the heating site 118 of the invention may be "behind" 510 the second end 508. "Behind" 510 may be defined by referencing a longitudinal axis that goes through the center of the hermetic element 106 (assuming the hermetic element 106 is radially symmetrical about the longitudinal axis) through a center position of the second end 508, with a distal direction along this axis going from the center of the hermetic element 106 through the center of the second end, "behind" 510 being any position that is distal of the second end 508 in the longitudinal axis (that is with reference to the axis, not along the axis, itself). In an embodiment, a direction distally, distally measured from the center of the hermetic element 106 through the center of the second end 508, may be considered a longitudinal axis such that any position outside of hermetic element 106 and distal of the second end 508 is "behind" 510 the hermetic element 106. Another way to express the definition of "behind" 510 is to state that "behind" represents all three-dimensional space that is distal of a plane defined by the second end 508. In another, potentially overlapping embodiment, the heating site 118 may be closer to the second end 508 than the first end 506.

It should be appreciated that the bisected side views shown in FIGS. 1-5 and later described FIGS. 8A-8E are merely representative of that view. Embodiments are contemplated where at least some of the elements referenced are symmetrical about the plane of bisection of the bisected view. There may be further radial symmetry about an axis along the longitudinal length of the interior member 108 at the center of the interior member 108 in vertical and transverse axes. For instance, the interior member 108 may be cylindrical and may have radial symmetry about a central axis, and any of the elements of FIGS. 1-5 and later described FIGS. 8A-8E may be symmetrical about this central axis.

Flowcharts

Figure 6:
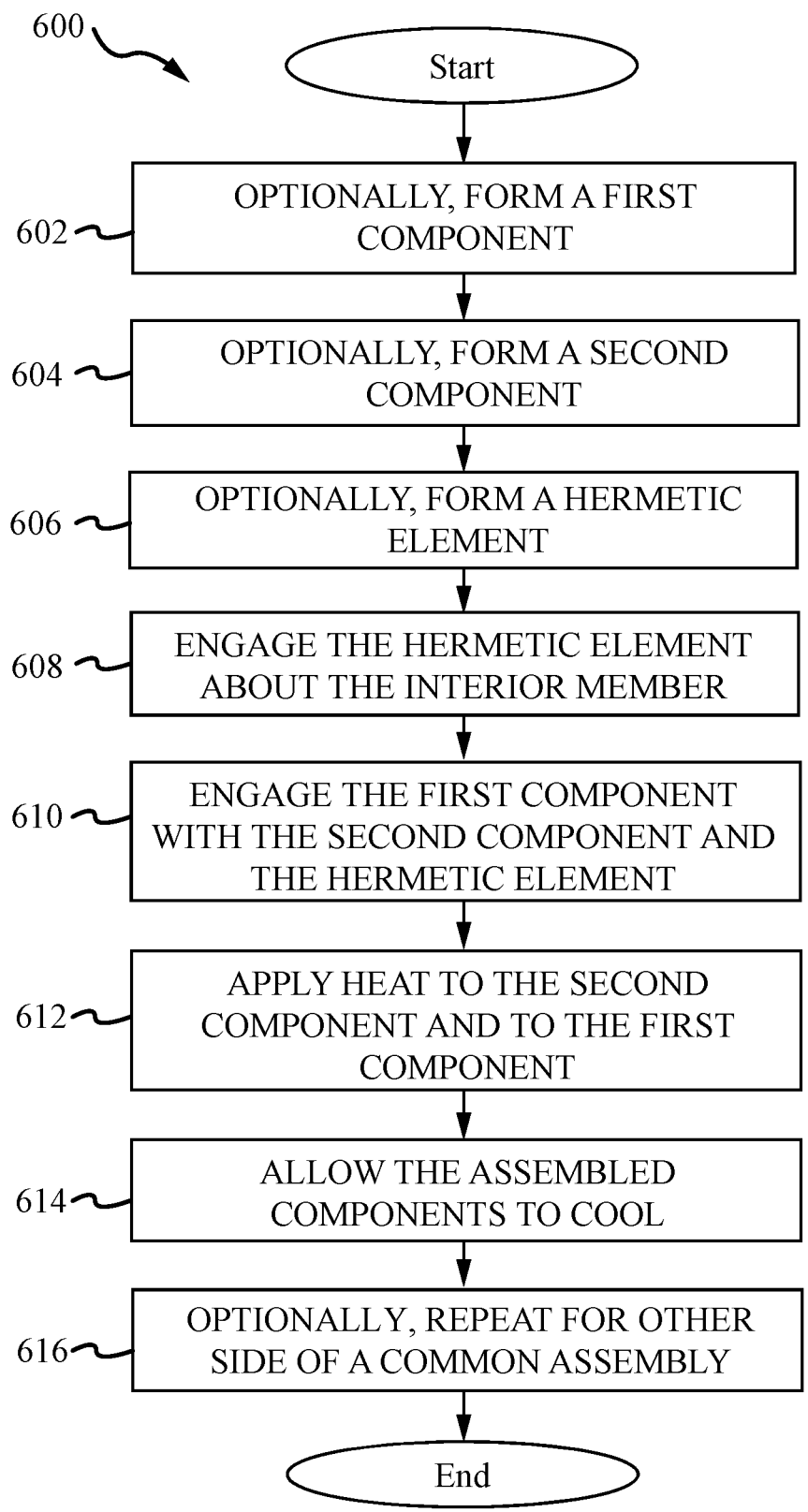
FIG. 6 shows a flowchart of an embodiment of a method 600 for forming a pressure fit hermetic seal by welding.
Figure 7:
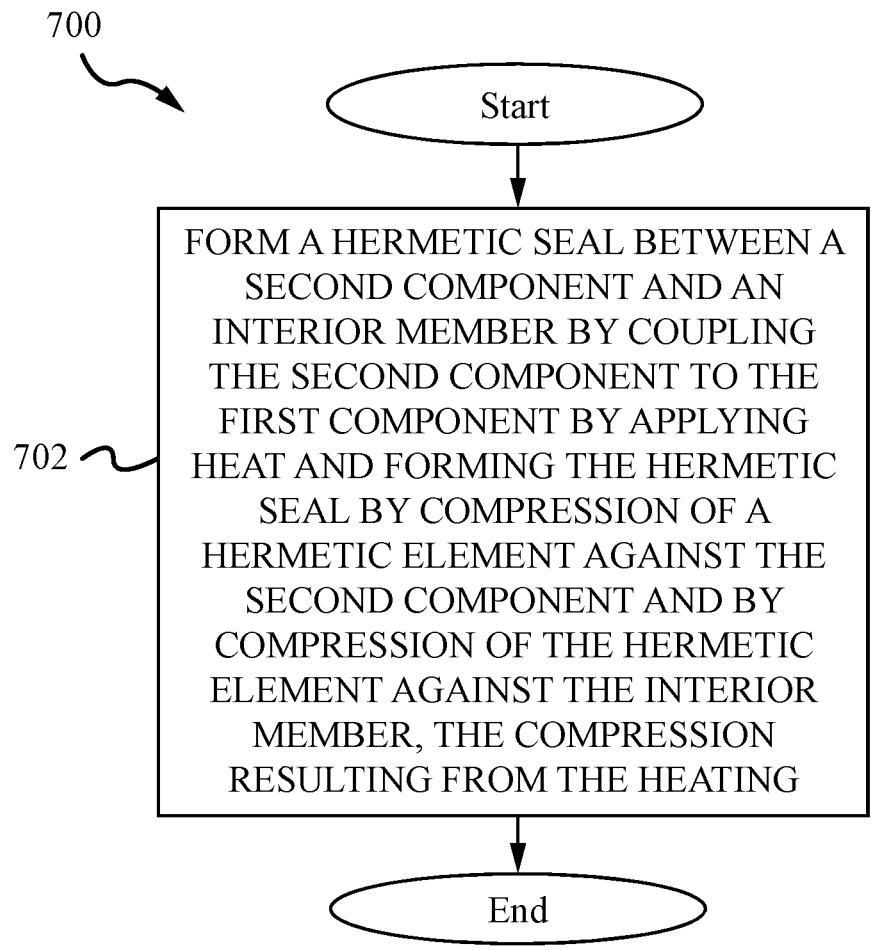
FIG. 7 shows a flowchart of an embodiment of a method 700 for forming a pressure fit hermetic seal by welding.

FIGS. 6-7 show flowcharts of embodiments of methods for forming a pressure fit hermetic seal by welding. The methods disclosed in the flowcharts are non-exhaustive and merely demonstrate potential embodiments of steps and orders. The methods must be construed in the context of the entire specification, including elements disclosed in descriptions of FIGS. 1-5 and FIGS. 8A-8E, the collection 100, assembly 200, common assembly 300, flange 400, and hermetic element 106 disclosed in FIGS. 1-5 and FIGS. 8A-8E, and/or the first component 102, second component 104, interior member 108, first coupling portion 110, second coupling portion 112, abutting end 114, flat hermetic end 116, external heating site 118, conformal interior periphery 120, flow tube 302, balance bar 304, flow sensors 306a and 306b, driver 308, support brackets 310a and 310b, case 312, hollow interior 402, coupling member 404, holes 406, optional flat end 408, conformal exterior 502, conformal interior 504, first end 506, and second end 508.

FIG. 6 shows a flowchart of an embodiment of a method 600 for forming a pressure fit hermetic seal by welding. In an embodiment, the method 600 may be an embodiment of a method for forming a hermetic seal between components of different materials. All methods, capabilities, relative arrangements, and relative couplings of all referenced elements, components and members disclosed in this specification are contemplated for accomplishing the steps of method 600.

Step 602 is optionally, forming a first component 102. The first component 102 may be, for instance, one of a flange 400 and a common assembly 300 (as described in the foregoing). The first component 102 may be formed using methods known in the art. The first component 102 may be formed such that it has a first coupling portion 110 that substantially conforms to the interior of a second component 104, perhaps at a second coupling portion 112 of the second component 104. As can be appreciated, when engaged before welding, these conforming elements may have very little space between them, perhaps on the order of thousandths of an inch or thousandths of a pipe diameter, as disclosed in this specification. In an embodiment, the first component 102 may be at least partially composed of one or more of stainless steel and C22.

Step 604 is optionally, forming a second component 104. The second component 104 may be for instance, the other of the one of a flange 400 or a common assembly 300 (as described in the foregoing). Other embodiments are contemplated where other components are coupled to form a hermetic seal using a weld. The interior of the second component 104 is configured to substantially conform to the exteriors of both the hermetic element 106 and the first coupling portion 110 (as stated in step 602), such that, when engaged before welding, these conforming elements may have very little space between them, perhaps on the order of thousandths of an inch or thousandths of a pipe diameter, as disclosed in this specification. In an embodiment, the second component 104 may be at least partially composed of one or more of stainless steel and C22.

Step 606 is optionally, forming a hermetic element 106. The hermetic element 106 may be of any shape and composed of any material known in the art or as disclosed in this specification. For instance, the hermetic element 106 may have a conformal exterior 502 that conforms to the interior of the second component 104, for instance, at the conformal interior periphery 120 of the second component 104. In an embodiment, the hermetic element 106 may have a conical or frustrum conformal exterior 502 such that when pressure is applied "behind" 510 the hermetic element 106, the conical or frustrum conformal exterior 502 of the hermetic element 106 may wedge into the conforming interior of the second component 104. The hermetic element 106 may have a cylindrical internal cavity such that the hermetic element 106 may conform its interior cavity to an interior member 108, for instance, a cylindrical flow tube 302 with a cylindrical exterior. The hermetic element 106 may have a first end 506 and a second end 508. In an embodiment, the second end 508 may be the flat hermetic end 116. In an embodiment, the second end 508 may be wider (e.g. have a greater width or have a greater exterior diameter) than the first end 506. In an embodiment a direction distally, distally measured from the center of the hermetic element 106 through the second end 508, may be considered a distal direction such that any area outside of and distal of the second end 508 is "behind" 510 the hermetic element 106. In an embodiment, the heating site 118 of the invention may be "behind" 510 the second end 508. In another, potentially overlapping embodiment, the heating site 118 may be closer to the second end 508 than the first end 506. In an embodiment, the hermetic element 106 may be formed of a material that is more malleable than the material of which one or more of the interior member 108, the first component 102 and the second component 104 is formed. For instance, in an embodiment, the hermetic element 106 may be composed of one or more of copper or brass.

Step 608 is engaging the hermetic element 106 about the interior member 108. When engaged before welding, there should be little space between the interior cavity of the hermetic element 106 and the exterior circumference of the interior member 108 (e.g. flow tube 302). In an embodiment in which the first component 102 is a flange, step 608 may further comprise engaging the conformal exterior 502 of the hermetic element 106 with the interior of the second component 104, perhaps such that there is little space between the conformal exterior 502 of the hermetic element 106 and the interior of the conforming portion of the second component 104 that conforms to the hermetic element 106.

In an embodiment in which the common assembly is the first component 102, Step 608 may involve sliding the hermetic element 106 onto the exterior of the interior member 108, such that the flat hermetic end 116 is engaged with an abutting end 114, perhaps an optional first flat end 408 of the common assembly 300. The reason for the difference in this and the prior described embodiment is that, in many embodiments, the interior member 108 (as a flow tube 302) is already coupled to the common assembly 300, regardless of which of the flange 400 and common assembly 300 are the first or second component 102 or 104. In this embodiment, the interior member 108 may be considered "integral" to the common assembly 300 before the method starts. In an embodiment, the hermetic element 106 may be composed of one or more of tantalum, zirconium, and titanium.

Step 610 is engaging the first component 102 with the second component 104 and the hermetic element 106. In an embodiment in which the first component 102 is a flange 400, the hermetic element 106 is already engaged with the conformal portion of the second component 104 (a part of the interior of the common assembly 300) in step 608. In this embodiment, the first component 102 may engage its abutting end 114 to the second end 508 (perhaps, at a flat hermetic end 116) of the hermetic element 106. After the engaging step 610, the second coupling portion 112 and the first coupling portion 110 may be engaged to at least partially overlap, the second coupling portion 112 at least partially radially external of at least part of a cross sectional peripheral exterior of the first coupling portion 110.

In an embodiment in which the first component 102 is a common assembly 300, the flange 400 may have the conformal interior periphery 120 for receiving the hermetic element 106, such that step 610 involves engaging the conformal interior periphery 120 of the second component 104 with the conforming exterior of the hermetic element 106.

It should be appreciated that when steps 608 and 610 are completed, the assembly having the first component 102, the second component 104, the hermetic element 106, and the interior member 108 is in place with little space between the first component 102, the second component 104, the hermetic element 106, and the interior member 108. For instance, after the engaging steps, any space in a radial direction between the hermetic element 106 and the interior member 108 may be less than 1, 2, 3, 4, 5, 6, 7, 8, 9, 10, or 11 thousandths of an inch or of an external diameter of the interior member 108. While the components are conformal to an extent that little space exists between them, they may still be free floating before a weld is applied.

Step 612 is applying heat, at a heating site 118, to the second component 104 and to the first component 102. The heat may be such that portions of the first component 102 and the second component 104 may be melted together at the heating site 118. This may create a secure weld between the first component 102 and second component 104. The heating may be applied at a heating site 118 as described in this specification. For instance, the heat may be applied to melt parts of the first coupling portion 110 and parts of the second coupling portion 112. In this embodiment, parts of the first coupling portion 110 and the second coupling portion 112 may be sacrificial to the weld. The heating site 118 may be located such that the first and second coupling portions 110 and 112 are coupled by a weld at the heating site 118. The heating site 118 may have different arrangements relative to other components in the system 200 when assembled. For instance, the heating site 118 may be one or more of on the exterior of a portion of the second component 104 at which there is some overlap between the first and second coupling portions 110 and 112 in a radial axis with respect to an interior member 108 (e.g. interior of flow tube 302), at a position closer to a second end 508 of a hermetic element 106 than a first end 506 of a hermetic element, at a position "behind" 510 the second end 508 of the hermetic element (as discussed in FIG. 5), at a position of overlap between a flange and a case, at a position where, during a weld shrink, the weld shrink will apply pressure to force a hermetic element 106 to create a hermetic seal between the second component 104 and the interior member 108, and/or the like.

The heating that forms the weld may also cause the materials at the side at which heat is applied to expand. This expansion may cause the abutting end 114 of the first component 102 to apply pressure longitudinally against the second end 508 (perhaps, at the flat hermetic end 116), perhaps causing a longitudinal force applied "behind" 510 the hermetic element 106. This may cause the conformal exterior 502 of the hermetic element 106 to be compressed against the conformal interior periphery 120 of the second component 104. In embodiments in which the hermetic element 106 acts like a wedge, for instance, in embodiments where the hermetic element 106 has a frustum like conformal exterior 502, the longitudinal pressure will translate to radial inward pressure. The expansion of the second component 104 may also cause a radial inward pressure. The radial inward pressure may compress the conformal interior periphery 120 against the conformal exterior 502 of the hermetic element 106 and may compress the hermetic element 106 such that the conformal interior 504 of the hermetic element 106 is compressed against the exterior of the interior member 108. This may represent a start of forming a pressure fit between the hermetic element 106, the second component 104, and the interior member 108 to begin forming the hermetic seal that at least hermetically seals the conformal interior periphery 120 of the second component 104 with the exterior of the interior member 108 via pressure fit of the hermetic element 106. It should be appreciated that, once this pressure is applied, one or more of the conformal interior periphery 120 and the hermetic element 106 may partially deform to form the pressure fit that leads to the hermetic seal. In embodiments in which the hermetic element 106 is more malleable than other components, the hermetic element 106 may be the element that is compressed. In an embodiment, sufficient heat is provided such that, after the heating step 612 and cooling step 614 are finished, a fusion bond forms between two or more of the first component 102, the second component 104, the hermetic element 106, and the interior member 108. In an embodiment, the heating applied in step 612 may not be sufficient and/or the heating site 118 may be too distant from the hermetic element 106 to melt the hermetic element 106.

Step 614 is allowing the assembled components to cool. This step involves letting all components cool, for instance, letting one or more of the first component 102, second component 104, hermetic element 106, and the interior member 108 cool. While the heating may cause longitudinal pressure to force the hermetic element 106 against the conformal interior periphery 120, it may not be sufficient to create a hermetic seal between the hermetic element 106 and the interior member 108. Cooling causes contraction in the entire system. This means that conformal interior periphery 120 will compress in both radial and longitudinal directions, causing direct radial inward compression that is reinforced by translated longitudinal compression to radially inwardly conform the conformal interior periphery 120 to the conformal exterior 502 of the hermetic element 106 and the conformal interior 504 of the hermetic element 106 to the exterior of the interior member 108, causing a hermetic seal between the conformal interior periphery 120 and the interior member 108 via the hermetic element 106. This may be further reinforced by longitudinal forces generated by the longitudinal contraction of one or more of the first component 102 and the second component 104 during cooling. The contraction of the first component 102, which may abut the hermetic element 106, may cause longitudinal compression against the hermetic element 106 that may further compress the hermetic element's 106 conformal exterior 502 to the conformal interior periphery 120 of the second component 104. Also, in embodiments where the conformal exterior 502 of the hermetic element 106 acts as a wedge (e.g. if the conformal exterior 502 is shaped like a frustum) some of the longitudinal compression caused by contraction of the first component 102 is again translated, via the shape of the conformal exterior 502 of the hermetic element 106 and the shape of the conformal interior periphery 120 of the second component 104, such that further compression is generated radially inwardly and internally to cause the hermetic element 106 to compress and make a hermetic seal. Again, the further inward radial compression of the conformal exterior 502 of the hermetic element against conformal interior periphery 120 causes the hermetic element 106 to compress radially inwardly around the circumference of the interior member 108 to make a hermetic seal between the conformal interior 504 of the hermetic element 106 and the exterior of the interior member 108.

It should be understood that a circumferential weld may require rotation of elements about an axis. In the embodiments disclosed, a heating site 118 would be heated while the assembly is rotated, in order to create a circumferential weld. When implementing steps 612 and 614, it should be understood that some portions of the circumference of the assembly will be heated and cooled before others. In this embodiment, during the rotation, the heating and cooling may be conducted quickly at each position. Also, heat may or may not be applied to the entire circumference of the welding site simultaneously. Heat is typically applied at a single position, and the assembly is rotated to weld the entire periphery at substantially the same longitudinal position about the circumference of the assembly. As such, step 612 is conducted at one position, and step 614 at that position may be occurring simultaneously with step 612 at a new position that is approached by a heating element, such as a welder, when the assembly is rotated. This means that different portions of the assembly may be welded at different times, perhaps making steps 612 and 614 sequential only for a particular position on a circumferential weld facilitated by rotating the assembly.

In an embodiment, the applying heat step 612 and the allowing to cool step 614 are sufficient to cause a longitudinal pressure 802 and a radial inward pressure 804, such that the longitudinal pressure 802 causes a compression of at least part of the hermetic element 106 in the longitudinal compression direction to be at least fifty thousandths of an inch, and the radial inward pressure 804 causes a compression of at least part of the hermetic element 106 in the radial inward compression direction to be at least twenty thousandths of an inch.

In an embodiment, a final product of steps 602 to 614 may be an assembly 200. Of course, the assembly 200 need not only be formed on one side of the common assembly 300. It may be advantageous to generate a pressure fit hermetic seal on another side of the common assembly 300. While the embodiments disclosed reflect flow sensors, it should be understood that these method steps may apply to any context in which one or more hermetic seals need to be formed.

Step 616 is optionally, repeating steps 602 to 614 for another side of an assembly. In an embodiment, the overall resulting apparatus may be a flow sensor. Flow sensors typically have at least two flanges 400 to be coupled to opposing ends of a common assembly 300 to form a flowmeter. Step 616 repeats steps 602 to 612 for another side of a flow sensor in order to complete the hermetic seal for both sides of the flow sensor. This may entail a hermetic seal at each of the flanges 400 or a hermetic seal at each of the common assembly 300 ends. Further embodiments are contemplated in which the hermetic seals are made as between all of the flange 400, an end of the common assembly 300, the flow tube 302, and the hermetic element 106.

In an embodiment, each of the steps of the method shown in FIG. 6 is a distinct step. In another embodiment, although depicted as distinct steps in FIG. 6, steps 602-616 may not be distinct steps. In other embodiments, the method shown in FIG. 6 may not have all of the above steps and/or may have other steps in addition to or instead of those listed above. The steps of the method 600 shown in FIG. 6 may be performed in another order. Subsets of the steps listed above as part of the method 600 shown in FIG. 6 may be used to form their own method. The steps of method 600 may be repeated in any combination and order any number of times, for instance, continuously looping in order to form multiple hermetic seals, perhaps, for one or more flow sensors.

FIG. 7 shows a flowchart of an embodiment of a method 700 for forming a pressure fit hermetic seal by welding. In an embodiment, the method 700 may be an embodiment of a method for forming a hermetic seal between components of different materials. All methods, capabilities, relative arrangements, and relative couplings of all referenced elements, components and members disclosed in this specification are contemplated for accomplishing the steps of method 700.

Step 702 is forming a hermetic seal between a second component 104 and an interior member 108 by coupling the second component 104 to the first component 102 by applying heat and forming the hermetic seal by compression of a hermetic element 106 against the second component 104 and by compression of the hermetic element 106 against the interior member 108, the compression resulting from the heating. In an embodiment, step 702 may involve embodiments of two or more of steps 602-614. In an embodiment, step 702 is forming a pressure fit hermetic seal between a second component 104 and an interior member 108, comprising coupling the second component 104 to the first component 102 by applying heat to one or more of the first component 102 and the second component 104 and allowing the first component 102 and the second component 104 to cool, wherein the applying heat step and allowing to cool step form the hermetic seal by causing compression of a hermetic element 106 against the second component 104 and by causing compression of the hermetic element 106 against the interior member 108. In an embodiment, step 702 may involve coupling the second component 104 to the first component 102 by applying heat to a heating site 118 on the exterior of the second component 104 when the first component 102 is engaged with all of the second component 104, the hermetic element 106, and the interior member 108, allowing the first component 102 and the second component 104 to cool, wherein the applying heat and allowing to cool steps form the hermetic seal by compression of a hermetic element 106 against the second component 104 and by compression of the hermetic element 106 against the interior member 108, the compressions resulting from expansion and contraction of heated portions of the first component 102 and the second component 104.

It should be understood that a circumferential weld requires rotation of elements about an axis. In the embodiments disclosed, a heating site 118 would be heated while the assembly is rotated, in order to create a circumferential weld. When implementing heating and allowing to cool steps, it should be understood that some portions of the circumference of the assembly will be heated and allowed to cool before others. In this embodiment, during the rotation, the heating and allowing to cool are conducted quickly at each position. Also, heat may not be applied to the entire circumference of the welding site simultaneously. Heat may be applied at a single position, and the assembly is rotated to weld the entire periphery at substantially the same longitudinal position about the circumference of the assembly. As such, heating is conducted at one position, and allowing to cool at that position may be occurring simultaneously with heating at a new position that is approached by a heating element, such as a welder, when the assembly is rotated. This means that different portions of the assembly may be welded at different times, perhaps making heating and allowing to cool steps sequential only for a particular position on a circumferential weld facilitated by rotating the assembly.

In other embodiments, the method shown in FIG. 7 may have other steps in addition to or instead of the step listed above. Subsets of the step listed above as part of the method 700 shown in FIG. 7 may be used to form their own method. The step of method 700 may be repeated any number of times, for instance, continuously looping in order to form multiple hermetic seals, perhaps, for one or more flow sensors.

Illustrations

FIGS. 8A-8E show illustrations explaining an embodiment of a progression of the pressure fit hermetic seal formed by welding described in the specification. These illustrations demonstrate embodiments of the relative position of items and the directions of pressure applied. For purposes of FIGS. 8A-8E the "components" refer to the first component 102 (illustrated as a flange 400), the second component (illustrated as a common assembly 300), the hermetic element 106, and the interior member 108 (illustrated as flow tube 302 that is already integrated into the common assembly 300).

FIG. 8A shows an illustration of a bisected side view of an embodiment of uncoupled components 800A before engagement or welding. The components are uncoupled, as is shown in FIG. 1.

Figure 8B:
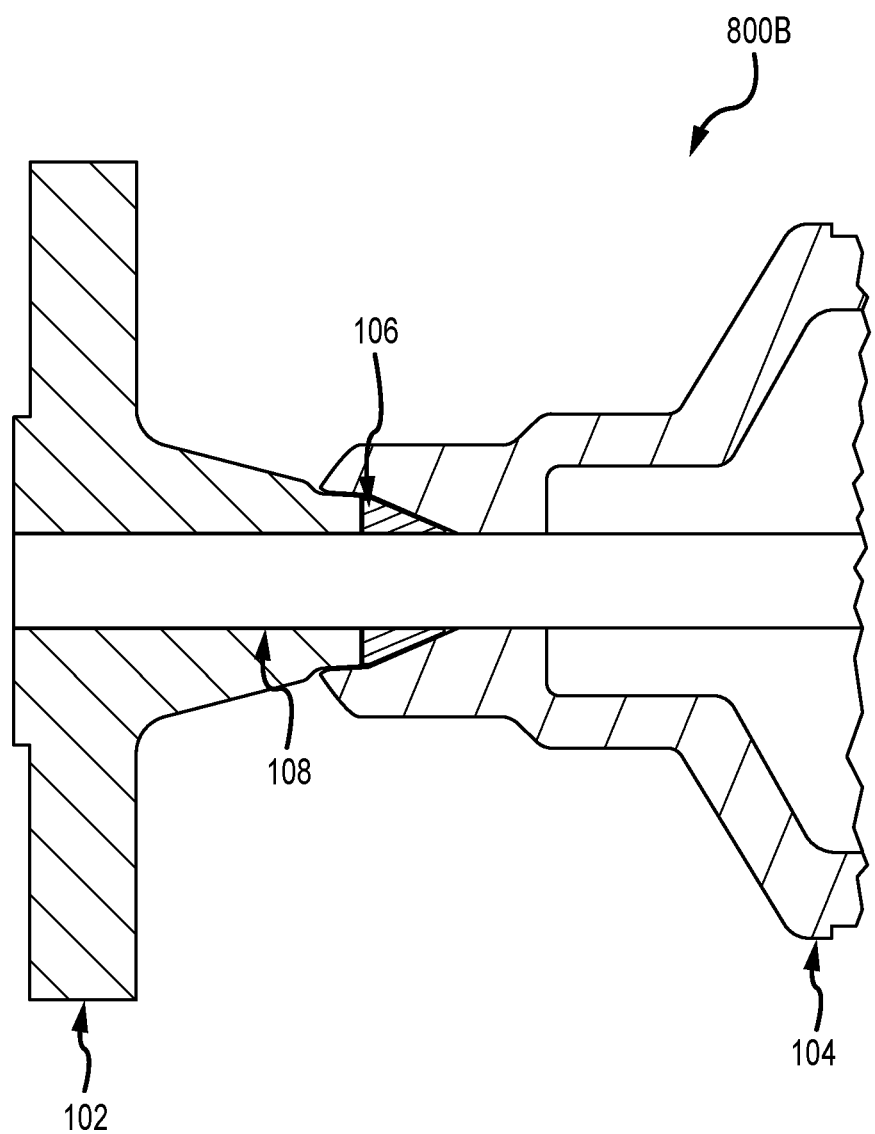
FIG. 8B shows an illustration of a bisected side view of an embodiment of uncoupled components after the components are engaged but before a weld.

FIG. 8B shows an illustration of a bisected side view of an embodiment of uncoupled components 800B after the components are engaged but before a weld. The components may have small spaces between them, but the components may be largely complementary and conformal, limiting those spaces. The first coupling portion 110 may be conformal with the second coupling portion 112 (reference numbers not shown but are shown in prior figures). The conformal interior periphery 120 of the second component 104 conforms to the conformal exterior 502 of the hermetic element 106. The conformal interior 504 of the hermetic element 106 conforms to the exterior of the interior member 108 (e.g. flow tube 302). The abutting end 114 may at least partially conform to the second end 508 (perhaps, the flat hermetic end 116).

Figure 8C:
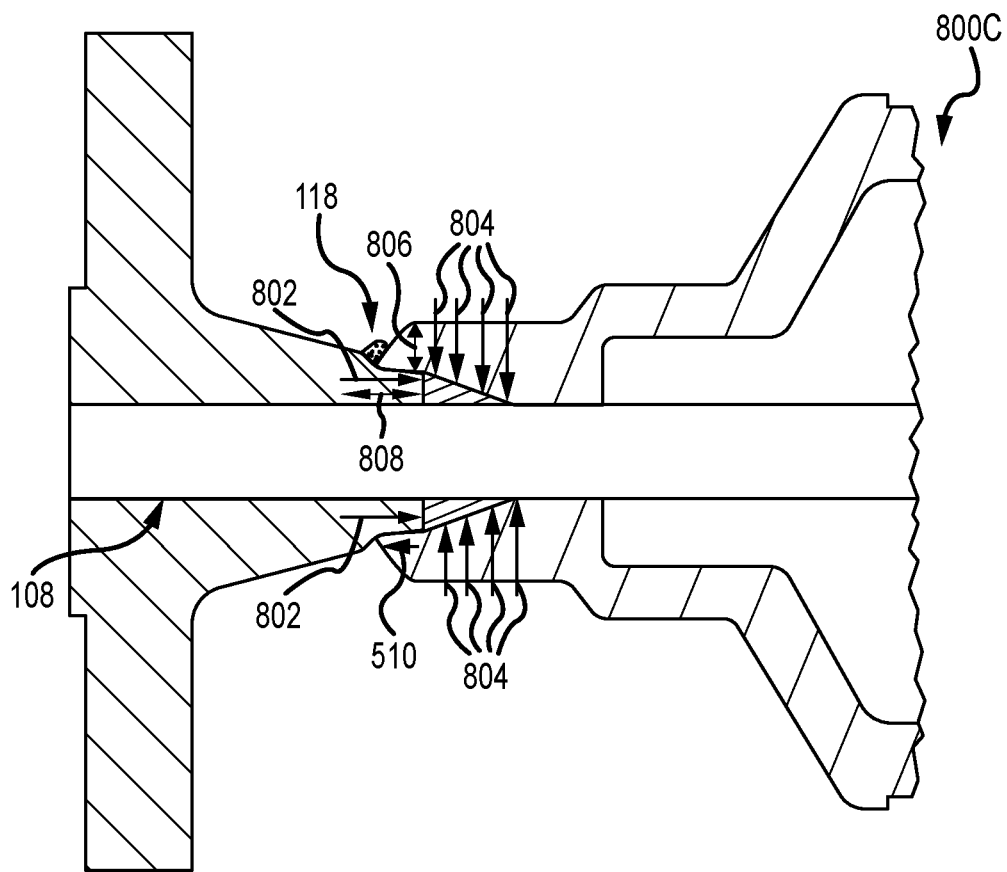
FIG. 8C shows an illustration of a bisected side view of an embodiment of components when heat is applied to form a weld between the second component 104 and the first component 102.

FIG. 8C shows an illustration of a bisected side view of an embodiment of components 800C when heat is applied to a heating site 118 to form a weld between the second component 104 and the first component 102. Although not shown, parts of each of the first coupling portion 110 and second coupling portion 112 may be sacrificial to the weld.

The heating causes expansion of the components. The expansion can be described as longitudinal expansion 808 and radial expansion 806. In the embodiment shown, the heat is applied "behind" 510 the second end 508 of the hermetic element 106. The longitudinal expansion 808 of heated portions of the first component 102 and the second component 104 causes a longitudinal pressure 802 against the hermetic element 106, compressing the hermetic element 106 against the conformal interior periphery 120 of the second component 104. In an embodiment where the hermetic element 106 may act as a wedge (for instance, if the exterior shape of the hermetic element is like a frustum), some of the longitudinal pressure 802 may be translated in a radial inward direction to generate some radial inward pressure 804 which may cause some radial compression of the hermetic element 106 against the conformal interior periphery 120 and some radial compression of the hermetic element 106 about the interior member 108.

The radial expansion 806 causes direct radial inward pressure 804. This may cause the conformal interior periphery 120 of the second component 104 to compress the hermetic element 106 at the conformal exterior 502 and cause translated compression through the hermetic element 106 to compress the conformal interior 504 of the hermetic element 106 against the exterior of the interior member 108. These compressions begin to form the hermetic seal by pressure fit. In an embodiment where the hermetic element 106 may act as a wedge (for instance, when the conformal exterior 502 is shaped like a frustum), some of the radial inward pressure 804 may be translated to longitudinal pressure 802.

Figure 8D:
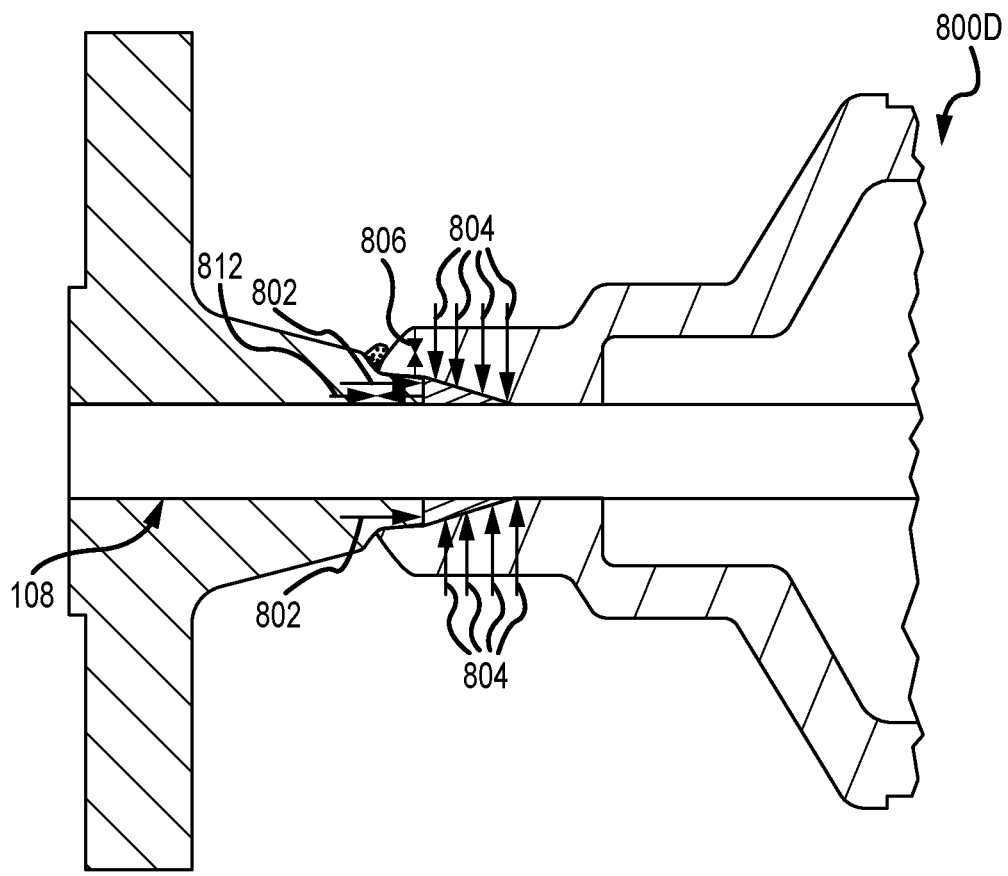
FIG. 8D shows an illustration of a bisected side view of an embodiment of components when the components are allowed to cool after the weld.

FIG. 8D shows an illustration of a bisected side view of an embodiment of components 800D when the components are allowed to cool after the weld. After heating, the site of the weld is allowed to cool (perhaps by rotating to a next heating site 118). The resulting coupling formed between the first component 102 and the second component 104 fixes relative positions of the first and second components 102 and 104. The portions of the first component 102 and the second component 104 that were heated contract when allowed to cool. The contractions can be described as longitudinal contractions 812 and radial contractions 810. The longitudinal contractions 812 directly cause a longitudinal pressure 802. The radial contractions 810 directly cause a radial inward pressure 804. It should be understood that the contractions may also cause translated pressures, such that the longitudinal contractions 812 cause some translated radial inward pressure 804 and radial contractions 810 may cause some translated longitudinal pressure 802 (for instance, in embodiments where the conformal exterior 502 of the hermetic element 106 is shaped like a frustum and/or acts as a wedge). The heated portions of components 102 and 104 contract when allowed to cool such that one or more of the conformal interior periphery 120 compresses the hermetic element 106 radially at the conformal exterior 502 of the hermetic element 106, causing further translated radial inward compression of the hermetic element 106 at the conformal interior 504 of the hermetic element 106 and the exterior of the interior member 108 (e.g. a flow tube 302). The contraction further causes one or more of the first component 102 and the second component 104 to compress the hermetic element 106 longitudinally against the conformal interior periphery 120. After heating and allowing to cool steps are completed, a hermetic seal is formed between the conformal interior periphery 120 of the second component 104, the hermetic element 106, and the interior member 108.

As stated above, the circumferential heating is applied only at one position at a time, with the assembly being rotated to allow the heating element to move along a substantially circumferential path at substantially the same longitudinal position. The embodiments shown in FIGS. 8C and 8D show only heating for one position. The assembly may be rotated while the heat is applied such that a circumferential or peripheral weld is formed about a circumference of the assembly at a particular longitudinal position with respect to the assembly. It can be appreciated that, as more positions along the circumference are heated and subsequently allowed to cool, the components may be coupled more closely, eliminating more space between the components and facilitating the hermetic seal. As stated, in an embodiment, the hermetic seal may be accomplished solely by a pressure fit. However, if sufficient heat is applied with correct relative conformal positions of components, a fusion bond may further be formed between two or more of the components. This fusion bond generated in those embodiments could be in addition to or instead of the pressure fit.

Figure 8E:
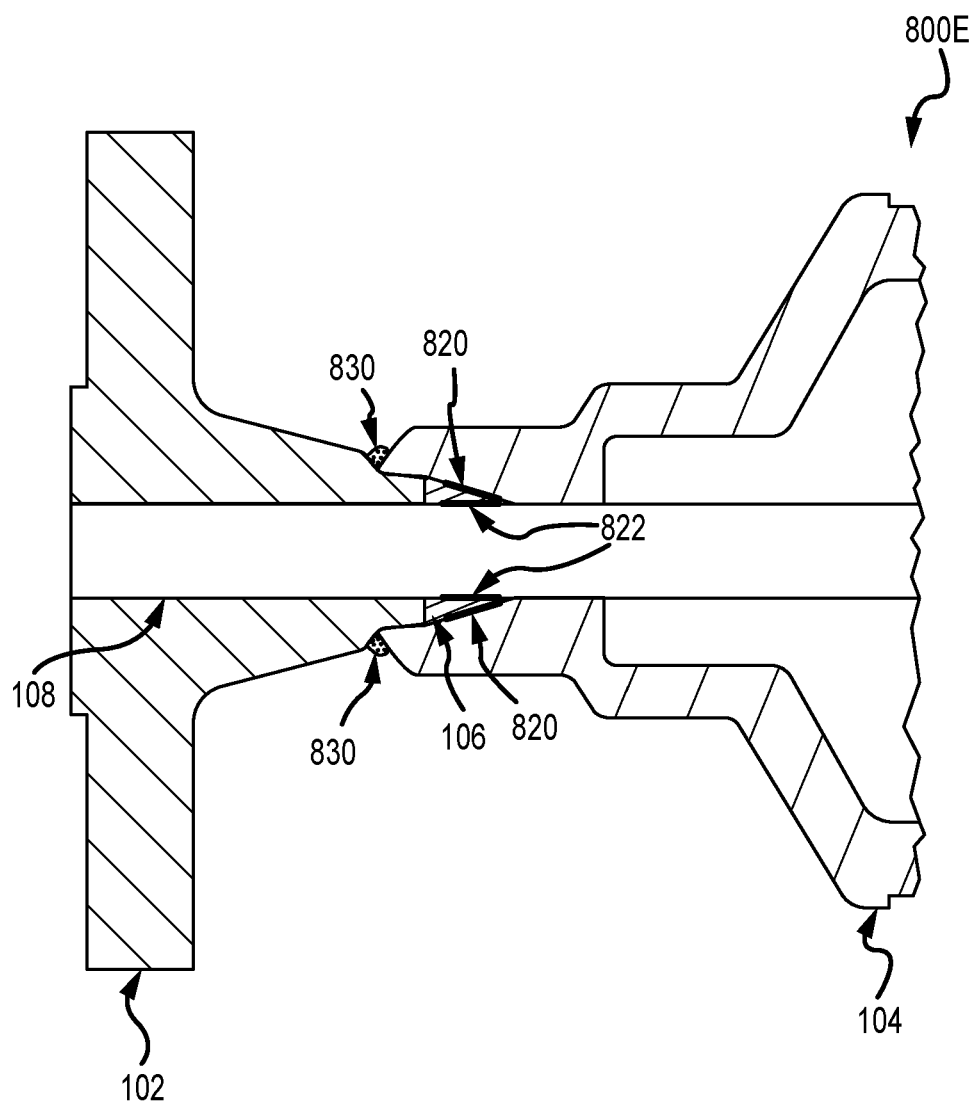
FIG. 8E shows an illustration of a bisected side view of an embodiment of components after the components are welded and allowed to cool.

FIG. 8E shows an illustration of a bisected side view of an embodiment of an assembly 800E formed after the components are welded and allowed to cool. The assembly 800E may be an embodiment of assembly 200. At least some of the small spaces that existed are absent because a hermetic seal has been formed. The hermetic seal may be as between certain specific elements (eliminating spaces that would prevent a hermetic seal), such as between the conformal interior periphery 120 and the interior member 108, and the hermetic element 106. This may represent an external hermetic seal 820 between at least part of the conformal interior periphery 120 and at least part of the conformal exterior 502 of the hermetic element 106 and an internal hermetic seal 822 between at least part of the conformal interior 504 of the hermetic element 106 and at least part of the interior member 108. In another embodiment, the hermetic seal may be as between the conformal interior periphery 120, the hermetic element 106, the interior member 108, and the first component 102. This may represent an external hermetic seal 820 between the conformal interior periphery 120 and the conformal exterior 502 of the hermetic element 106, an internal hermetic seal 822 between the conformal interior 504 of the hermetic element 106 and the interior member 108, and another hermetic seal (not shown) between the abutting end 114 and the second end 508 (perhaps, at the flat hermetic end 116) of the hermetic element 106. It is also contemplated that the pressures applied may further cause fusion bonding between any of the components, perhaps further securing the hermetic seal. It can be seen that, after the welding is completed, a weld 830 composed of all of the weld beads formed around the perimeter of the assembly is formed by the heating.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description. When specific numbers representing parameter values are specified, the ranges between all of those numbers as well as ranges above and ranges below those numbers are contemplated and disclosed.

Thus, although specific embodiments are described herein for illustrative purposes, various equivalent modifications are possible within the scope of the present description, as those skilled in the relevant art will recognize. The teachings provided herein can be applied to other methods and apparatuses for forming a pressure fit hermetic seal by welding and not just to the embodiments described above and shown in the accompanying figures. Accordingly, the scope of the embodiments described above should be determined from the following claims.

I claim:

1. An assembly (200) comprising:
a first component (102) comprising a first coupling portion;
a second component (104) comprising a second coupling portion, coupled to the first coupling portion;
a hermetic seal (106) coupled to the first component and hermetically sealed to the second component;
an interior member (108) that passes through the hermetic seal, is hermetically sealed thereto, and contacts the first component and the second component;
a weld joint joining the first component to the second component, wherein the hermetic seal is captured between the first and second component.

2. An assembly (200) as claimed in claim 1, comprising:
a heating site operable to receive heat and collocated with the first component, the second component, and the weld joint, wherein the first and second components are configured to expand when the heating site receives heat, and subsequently retract when heat is removed from the heating site;
a conformal interior periphery of the second component;
a conformal exterior of the hermetic seal comprising an interface between the conformal interior periphery and the conformal exterior, and wherein the hermetic seal hermetically seals to the second component upon expansion and contraction of the first and second components.

3. An assembly (200) as claimed in claim 2, comprising:
an abutting end of the first component;
a first end of the of the hermetic seal;
a second end of the hermetic seal, wherein the heating site (118) is proximate (510) the second end.

4. An assembly (200) as claimed in claim 3, wherein the abutting end (114) of the first component (102) comprises a first flat end, and the second end (508) of the hermetic seal (106) comprises a mating flat portion abuttable to the abutting end.

5. An assembly (200) as claimed in claim 2, wherein the conformal interior (504) comprises a hollow portion, and the conformal interior at least partially conforms to the exterior of the interior member (108) and the conformal exterior (502) at least partially conforms to the conformal interior periphery (120) of the second component (104).

6. An assembly (200) as claimed in claim 5, wherein the hollow portion of the conformal interior (504) is cylindrical and the conformal exterior (502) is in the shape of a peripheral exterior of a frustrum.

7. An assembly (200) as claimed in claim 1, wherein the first component (102) is one of a flange (400) and a common assembly (300) and the second component (104) is the other of the flange (400) and the common assembly (300), and wherein the interior member (108) is a flow tube (302) that has been coupled to an interior of the common assembly (300).

8. An assembly (200) as claimed in claim 1, wherein the hermetic seal (106) is composed of a material that is more malleable than the material of which one or more of the first component (102), the second component (104), and the interior member (108) is composed.

9. An assembly (200) as claimed in claim 1, wherein the interior member (108) is at least partially composed of one or more of tantalum, zirconium, and titanium and wherein one or more of the first component (102) and the second component (104) is at least partially composed of one or more of stainless steel and C22.

10. An assembly (200) as claimed in claim 1, where the first component comprises a first coefficient of thermal expansion, and the second component comprises a second coefficient of thermal expansion.

11. A method for forming a pressure fit hermetic seal comprising:
providing a first component comprising a first coupling portion;
providing a second component comprising a second coupling portion;
coupling the second coupling portion to the first coupling portion;
coupling a hermetic seal to the first component;
hermetically sealing the hermetic seal to the second component;
providing an interior member;
passing the interior member through the hermetic seal, contacting the first component and the second component, and hermetically sealing the interior member to the hermetic seal;
joining the first component to the second component with a weld joint; and
capturing the hermetic seal between the first and second component.

12. A method as claimed in claim 11, comprising:
applying heat to a heating site collocated with the first component, the second component, in forming the weld joint;
expanding the first and second components when the heating site receives the heat;
subsequently retracting the first and second components when the heat is removed from the heating site;
defining a conformal interior periphery of the second component;
defining a conformal exterior of the hermetic seal comprising an interface between the conformal interior periphery and the conformal exterior, and;
hermetically sealing the second component to the hermetic seal upon expansion and contraction of the first and second components.

13. A method as claimed in claim 12, comprising:
forming a hollow portion of the conformal interior (504);
at least partially conforming the hollow conformal interior (504) to the exterior of the interior member (108); and
at least partially conforming the conformal exterior (502) to the conformal interior periphery (120) of the second component (104).

14. A method as claimed in claim 13, wherein the hollow portion of the conformal interior (504) is cylindrical and the conformal exterior (502) is in the shape of a peripheral exterior of a frustrum.

15. A method as claimed in claim 11 comprising:
providing an abutting end of the first component;
providing a first end of the of the hermetic seal;
providing a second end of the hermetic seal, wherein the heating site (118) is proximate (510) the second end.

16. A method as claimed in claim 15, comprising:
providing a first flat end of the abutting end (114) of the first component (102); and
providing a mating flat portion of the second end (508) of the hermetic seal (106) abuttable to the abutting end.

17. A method as claimed in claim 11, wherein the first component (102) is one of a flange (400) and a common assembly (300) and the second component (104) is the other of the flange (400) and the common assembly (300), and wherein the interior member (108) is a flow tube (302) that has been coupled to an interior of the common assembly (300).

18. A method as claimed in claim 1, wherein the hermetic seal (106) is composed of a material that is more malleable than the material of which one or more of the first component (102), the second component (104), and the interior member (108) is composed.

19. A method as claimed in claim 1, wherein the first component comprises a first coefficient of thermal expansion, and the second component comprises a second coefficient of thermal expansion.

* * * * *